May 29, 1956  M. McCAFFERTY  2,747,448
EXPANDING JAW WRENCH WITH SLIDING WEDGE OPERATOR
Filed June 1, 1954  2 Sheets-Sheet 1
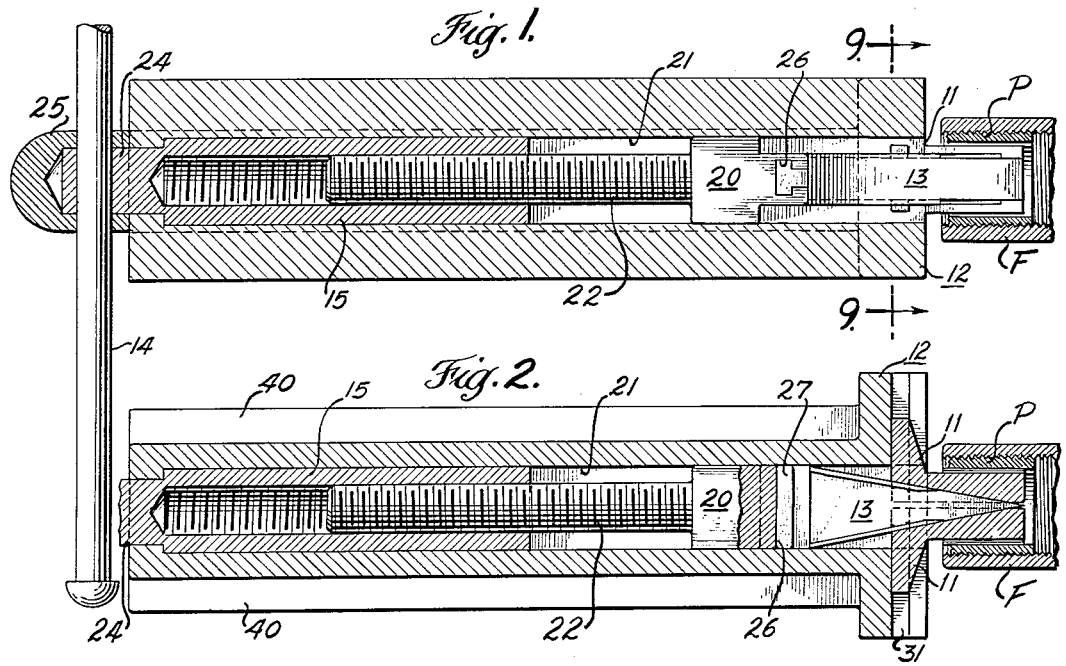
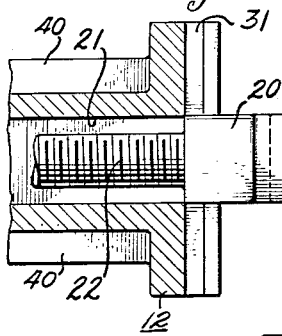
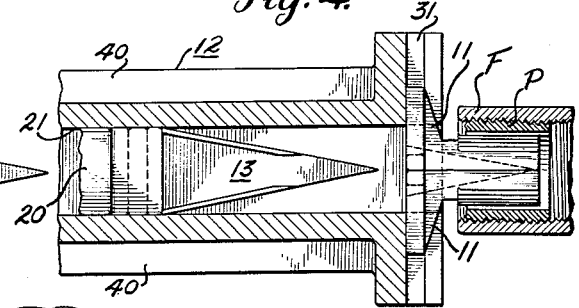
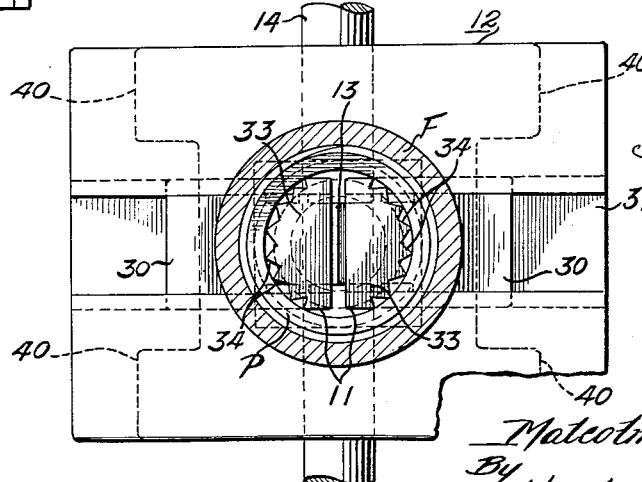
Inventor
Malcolm McCafferty
By Howson & Howson
Attorneys May 29, 1956 M. McCAFFERTY 2,747,448
EXPANDING JAW WRENCH WITH SLIDING WEDGE OPERATOR
Filed June 1, 1954 2 Sheets-Sheet 2
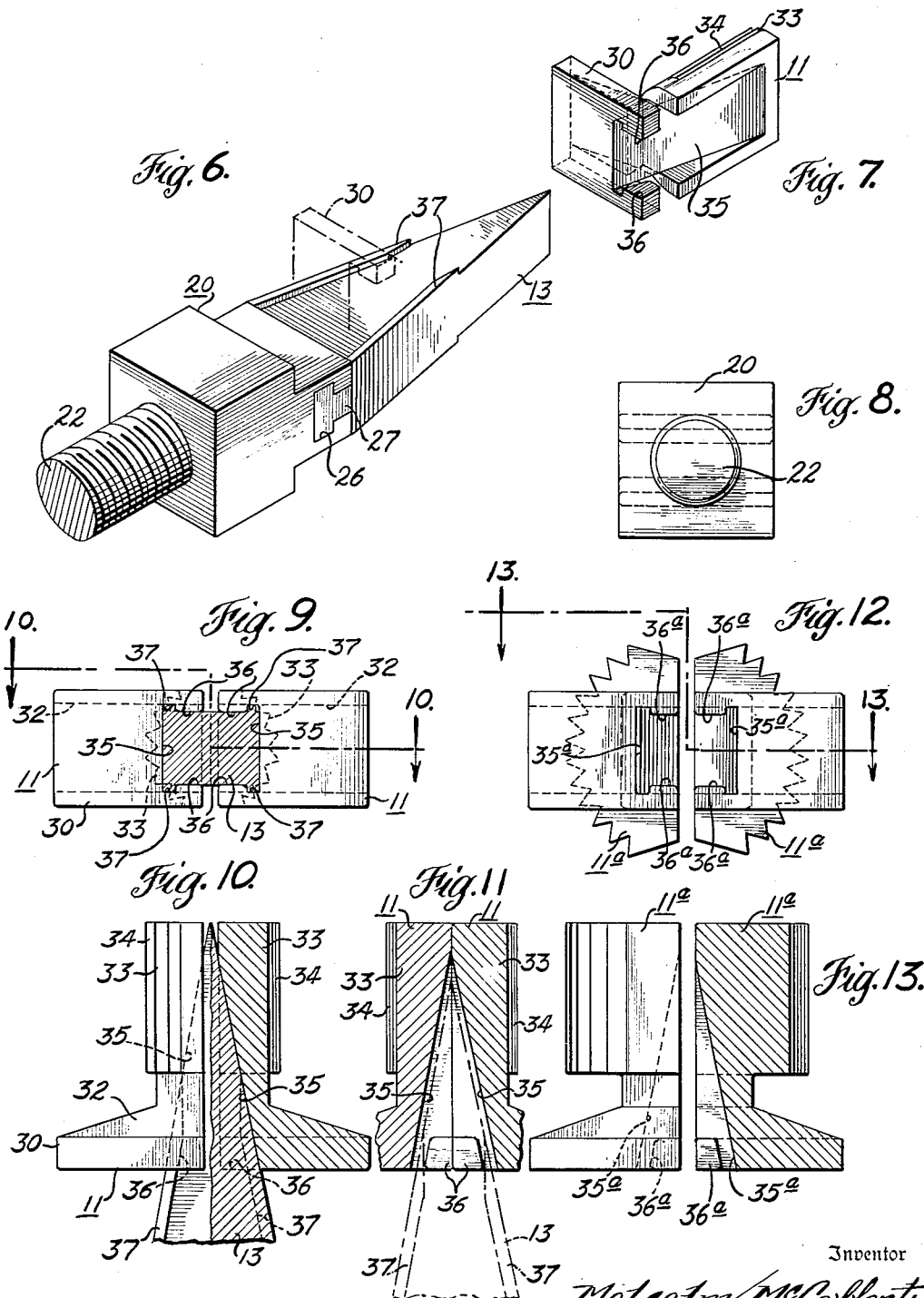

United States Patent Office 2,747,448
Patented May 29, 1956

2,747,448

EXPANDING JAW WRENCH WITH SLIDING WEDGE OPERATOR

Malcolm McCafferty, Chester, Pa.

Application June 1, 1954, Serial No. 433,502

1 Claim. (Cl. 81—72)

The present invention relates to devices for salvaging pipe fittings in which ends of pipes have been broken off. More particularly, the invention relates to a device which is adapted to enter the fitting and grip the interior surface of the broken pipe end so as to afford removal of the fitting from the pipe end.

In the plumbing and related trades, a substantial quantity of material is lost over a period of time because of broken pipe ends lodged in fittings. When the pipe projects out of the fitting, it is a simple matter to apply pliers to the projecting end and thread off the broken pipe, but where the pipe is broken off within the fitting, it has been practically impossible to remove the broken end and salvage the fitting for future use. Although the fitting could be salvaged by hours of labor in removing the broken pipe end, the cost of the fitting does not warrant the expenditure of the time and labor necessary to remove the pipe ends from the fittings. Consequently, the fittings in which pipe ends are broken off are usually discarded or scrapped.

With the foregoing in mind, a primary object of the present invention is to provide a novel device which may be clamped in a vise or mounted in a base of its own and is operable to be inserted into the fitting to grip the interior surface of the broken pipe end so that the fitting may be threaded off of the pipe.

Another object of the invention is to provide a novel device of the stated character which is readily adaptable to accommodate fittings and pipes of a wide variety of sizes.

A further object of the invention is to provide a device which readily clamps and releases the broken pipe end.

Still another object of the present invention is to provide a device of improved structural and functional characteristics which is extremely economical to manufacture.

These and other objects of the invention and the features and details of the operation and construction thereof are more fully set forth hereinafter with reference to the accompanying drawings in which:

Fig. 1 is a longitudinal vertical sectional view showing the actuating members for the pipe gripping elements or jaws in elevation;

Fig. 2 is a fragmentary horizontal sectional view similar to Fig. 1;

Fig. 3 is a fragmentary sectional view similar to Fig. 2 showing the actuating elements in their full extended position for removal and replacement of the wedge-shaped element thereof;

Fig. 4 is a fragmentary view similar to Fig. 2 showing the actuating elements in their rearward retracted limit position and the pipe gripper elements in position for engaging the broken pipe end;

Fig. 5 is an enlarged end elevational view as seen from the right hand end of Fig. 1;

Fig. 6 is a detached perspective view of the actuator elements of the gripping elements;

Fig. 7 is a detached perspective view of a gripping element;

Fig. 8 is an end elevation as seen from the left hand end of the actuating mechanism;

Fig. 9 is a sectional view taken on the line 9—9 of Fig. 1 with the casing removed;

Fig. 10 is a sectional view taken on the line 10—10 of Fig. 9 showing the actuator advancing to separate the gripping elements;

Fig. 11 is a fragmentary view similar to Fig. 10 showing the actuator element in broken lines and the gripping element in position after retraction of the actuator element;

Fig. 12 is a view similar to Fig. 9 showing the substitution of gripping elements for a larger size of pipe; and Fig. 13 is a sectional view taken on the line 13—13 of Fig. 12.

Referring to the drawings, the illustrated embodiment of the invention comprises a pair of jaws or gripping elements 11, 11 which are mounted for lateral separation and closing in a housing block 12. A wedge member 13 is advanced and retracted into engagement with the inner surfaces of the jaws 11 by a handle member 14 operatively connected to a rotatable barrel 15 mounted in the casing 12. Advance of the wedge member 13 separates the jaws 11, 11 and retraction of the former member closes the jaws as described more fully hereinafter.

In accordance with the invention, the jaws 11, 11 are actuated from the closed position shown in Fig. 4 wherein the jaws are spaced from the pipe P lodged in the fitting F, to the open or separated position, for example shown in Fig. 2 wherein the jaw elements forcibly engage the interior surface of the pipe P. The jaws are actuated to their separated position by the wedge element 13. The wedge element as shown in Figs. 3 and 6 is mounted in a carrier block 20. The carrier block is slidably mounted in the square bore 21 of the housing 12 and is provided with a rearwardly projecting threaded shaft 22. The block 20 is square to seat properly in the bore 21 and prevent relative rotation thereof as the barrel member 15 is rotated in the bore. The barrel is cylindrical in shape and is rotatably mounted in the square bore 21 of the housing 21 and is formed with a threaded bore to threadably engage the shaft 22. To prevent axial displacement of the barrel in the bore, the barrel is provided with a reduced end portion 24 which projects through the end wall of the housing and has an aperture for receiving handle 14. A cap 25 fits over the reduced end portion 24 and bears against the end wall of the housing 12. The cap 25 is also provided with apertures to register with the aperture in the end portion 24 and receive the handle 14 so that the handle passes through the apertures in the cap and the end portion to prevent relative movement of the cap and the barrel. Thus, the cap and the shoulder between the reduced end portion and the body portion of the barrel member prevent axial movement of the latter member by reason of their engagement against opposite sides of the end wall. Thus, rotation of the barrel member 15 advances and retracts the carrier block 20 which effects similar movement of the wedge member 13.

In accordance with the invention, the wedge member 13 is releasably engaged with the carrier block 20, so that different wedge members may be assembled to the carrier block to cooperate with jaw members for clamping various sized pipes. To this end, the carrier member 20 is formed with a transverse T-slot 26 which slidably receives a T-shaped end portion 27 of the wedge member 13. Thus, different wedge members may be mounted in the member 20.

In accordance with another feature of the invention, the jaw members 11, 11 are slidably mounted for separation and closing movement laterally in the housing 12. To this end, the jaw members are formed with a base portion 30 which is slidably mounted in a transverse T-slot 31 in the forward end wall of the casing 12. The base portion 30 is snugly received in the T-slot and supports the jaw member against twisting movement under the action of the wedge member 13. As seen in Fig. 10, the base is formed integrally with a web 32 which mounts the body portion 33 of the jaw member 11.

The outer face of the body portion 33 is serrated or toothed as indicated at 34 to provide a firm grip on the interior bore of the pipe P. The interior face of the jaw member is provided with a tapered recess 35 the walls of which converge at an angle corresponding to the angle of taper of the wedge 13. Thus, the force of the wedge member acting on the tapered recess 35 has little tendency to displace the wedge member angularly, but affords lateral movement of the base member 30 within the T-slot 31. Thus, as the jaw members are displaced laterally so as to be separated and to clamp against the interior bore of the pipe P. Thus, the serrated faces 34 of the jaw members 11 forcibly engage the pipe and prevent rotation of the pipe on the jaw member, whereby the fitting may be screwed off of the pipe end P so that it may be used again as desired.

Means is provided to release the jaw member from clamping engagement with the pipe upon retraction of the wedge member 13. This is accomplished by a pair of inwardly projecting lugs 36 at the base end of the tapered recess 35. The lugs 36 are spaced apart from the tapered wall of the recess 35 to afford entry therebetween of upstanding lips or ribs 37 on the wedge member 13. Upon advance of the wedge member, the ribs pass between the lugs 36 and the tapered wall of the recess 35 and upon retraction thereof, the inner surfaces of the lips bear against the lugs 36 to force the jaw members together so as to release the clamping engagement of the jaws with the pipe P.

The present invention provides means for inserting different sized jaw members in the housing 12 to accommodate larger or smaller pipes. Figs. 12 and 13 illustrate such an enlarged jaw member. It is noted that the jaw members 11a, 11a are provided with tapered recesses 35a and lugs 36a which are adapted to cooperate with the wedge 13, the converging walls of the recess conforming to the taper of the wedge 13 and the lug being spaced from the tapered surface to accommodate the rib or lip 37. For a pipe larger than that accommodated by the members 11a, 11a, it may be desirable to provide larger wedge members as well as larger jaw members, or for smaller pipes, it is desirable to provide smaller wedge members so that the wedge will fit within the body portion of the smaller jaw member.

From the foregoing description, it has been shown that the present invention provides a novel mechanism for salvaging fittings and the like. The mechanism is extremely simple in construction and operation and is proof against functional deterioration. It is noted that the housing is adapted to be received in the jaws of a conventional vise. To this end the side walls of the housing have projecting flanges 40, 40 which are spaced apart as shown in Fig. 5 to receive between them the jaws of a vise. When thus seated, the housing is held securely against rotation when the handle 14 is turned. If desired a special standard may be provided to engage between the flanges 40, 40 and support the housing.

While a particular embodiment of the invention has been herein illustrated and described, it is not intended to limit the invention to such disclosure and changes and modifications may be made therein and thereto within the scope of the following claim.

I claim:

In a device for removing a pipe end from a fitting or the like, a housing having interior walls defining a longitudinal rectangular bore, means defining a transverse T-slot in said housing adjacent one end of the bore, opposed jaw members having a T-shaped base portion slidably mounted in said T-slot for relative separation and closing, and having a serrated substantially semi-cylindrical body portion projecting longitudinally from said base portion beyond said housing, the interior faces of said body portions in closed position lying flush against each other to present a substantially cylindrical body for insertion in the bore of the pipe end, means to actuate said jaw members between the open and closed positions comprising a rectangular block slidable longitudinally in the rectangular bore of said housing and having a transverse open-ended T-slot therein, a wedge member having a T-shaped extension mounted in the T-slot of said block for longitudinal movement with said block and engaged against the opposite interior walls of said housing to prevent lateral disengagement from the T-slot of said block, longitudinal lips on said wedge member projecting outwardly therefrom in parallel relation to the wedge surfaces confronting said movable jaw members, said jaw members having a tapered groove on the interior face thereof to receive the wedge member, the face of said groove engaging the wedge surface of the wedge member having an inclination corresponding to the inclination of said wedge surface so as to lie flush against the same, and lugs on said jaw members projecting into the groove thereof and engageable behind said lip to displace said jaw members inwardly toward each other upon retraction of said wedge member, to thereby release the engagement of said jaw members with the bore of the pipe end.

References Cited in the file of this patent

UNITED STATES PATENTS

| | | |
|---|---|---|
| 1,507,645 | Wedgeworth | Sept. 9, 1924 |
| 1,968,872 | Campbell | Aug. 7, 1934 |
| 2,273,982 | Ostas | Feb. 24, 1942 |
| 2,360,054 | Haas | Oct. 10, 1944 |
| 2,601,260 | Calfee | June 24, 1952 |